Figure 1:
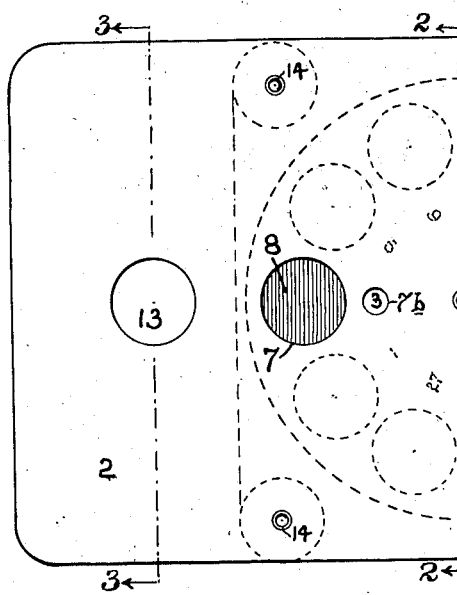

April 27, 1926. 1,582,122

G. W. CLAPP

METHOD AND MEANS FOR DETERMINING COLOR CHARACTERISTICS

Filed March 3, 1924  2 Sheets-Sheet 1

Inventor
George Wood Clapp.
By
Attorney.

April 27, 1926.  
G. W. CLAPP  
1,582,122  
METHOD AND MEANS FOR DETERMINING COLOR CHARACTERISTICS  
Filed March 3, 1924  2 Sheets-Sheet 2

Inventor,  
George Wood Clapp.  
By  
Attorney.

Patented Apr. 27, 1926.

1,582,122

UNITED STATES PATENT OFFICE.

GEORGE WOOD CLAPP, OF NEW ROCHELLE, NEW YORK, ASSIGNOR TO THE DENTISTS' SUPPLY COMPANY, A CORPORATION OF NEW YORK.

METHOD AND MEANS FOR DETERMINING COLOR CHARACTERISTICS.

Application filed March 3, 1924. Serial No. 696,432.

*To all whom it may concern:*

Be it known that I, GEORGE WOOD CLAPP, a citizen of the United States, and resident of New Rochelle, county of Westchester, and State of New York, have invented an Improvement in Methods and Means for Determining Color Characteristics, of which the following is a specification.

My invention has for an object a method and mechanical means adapted to enable a dentist to determine the characteristic color of the skin of a person with a view of improving the quality of the service to be rendered by him in certain forms of dental work, and especially to enable him to decide which of several shades in artificial teeth is most harmonious with the complexion as a whole or with any selected part thereof.

It has been difficult, even for a pains-taking dentist, to select artificial teeth satisfactorily as to color, partly because there has been no exact delineation of the colors dominant and submerged in a given complexion and in the teeth, and because they have not known how to achieve either harmony or a pleasing disharmony in particular cases where contrast is desirable.

This invention will enable the dentist to make a selection of artificial teeth having the proper color or hue which will be most pleasing and in harmony with the complexion characteristics of the patient, which is something that has heretofore been difficult of accomplishment in view of the lack of means adapted to exclude cross lights and the securing of isolated portions of the complexion for comparison with enlargements of the area of color characteristic of the tooth shades.

The utility of my invention is based upon the fact that some skins show more gray than others, some likewise show more red than others, and yet in other cases, more yellow predominates; and the knowledge of the proportions of the several colors in the skin will enable the dentist to select artificial teeth in which the harmonious colors are dominant, it being understood that in the making of the artificial teeth, coloring oxides or their equivalent are incorporated in connection with the silex or porcelain making material for insuring the proper color or shade characteristics desired.

By experimental research, the color composition of a large number of skins has been determined and from these a selected small number have been classified as representative of the much larger number and are employed in connection with my improvements as the basis of comparison, with the tooth shades. Moreover, I have prepared colored samples of material respectively having color characteristics corresponding to the selected color components of the skin, and the colors represented by these colored materials also correspond to the color or shade characteristics of the commercial artificial teeth specially made according to the shade guide requirements.

In the utilization of my invention, the specially prepared colored surfaces are successively compared with the complexion of selected parts of the skin of the patient, until the one which most closely approximates the color of the skin is determined, and thereupon, by reference to a suitable chart or indicia, preferably associated with the colored test surfaces, the corresponding or nearest approximating color or shade of the artificial teeth are indicated by reference to the number of the tooth shade guide which designates the various shades or colors of the artificial teeth manufactured under certain numbers or indicia. In this connection, it may be stated that, by means of certain data to be published in connection with the device and which may constitute the indicia, the proportions of the several component colors employed in the selected color material may be made known and this information may be employed in connection with the manufacture of artificial teeth or other articles or for other purposes of a pathological nature referred to hereinafter.

The colored materials, which are prepared as above stated for comparison with complexions, may be so classified, according to the proportions of the colors incorporated in making the composite color effect, as to form a basis for the classification of complexions into groups, each group having a dominant color which should be followed in the selection of artificial teeth when it is desired to employ such teeth with a patient whose complexion is in a group having such dominant color.

While the object of my invention is specially useful in the preparation and selection of artificial teeth, the essence of the invention, directed to the preparation of the colored materials for comparison with the skin colors, may be also applied to other purposes, as in the selection of coloring of an artificial hand or for artists in portrait painting, as examples, and also for enabling physicians to make records of changes in color of the skin in patients to indicate conditions of health, and more particularly in establishing certain pathological conditions which may be indicative of or in confirmation of certain symptoms peculiar to special diseases or derangement of the patient's system.

The method or employment of the principles involved in this invention comprehends the shielding of the face or body portion of a person with the exception of a small area which visually exposes the color or tint thereof and comparing therewith a plurality of previously prepared colored surfaces having definite or known composition or components as to color and of which there is a dominant color, the components of said color effect being designated by indicia in connection with the colored surfaces employed in making the comparison, whereby the proportion of the colors and dominant color may be determined.

My invention also comprehends certain apparatus or means for more conveniently carrying out the method and providing the dentist or doctor with adjustable color surfaces associated with a suitable apertured shield whereby a proper comparison of the colored surfaces may be made with the skin or other part of the patient exposed through the aperture.

My invention also comprehends other features and details of construction, all of which are more fully described hereinafter and more particularly defined in the claims.

Figures 2, 3:
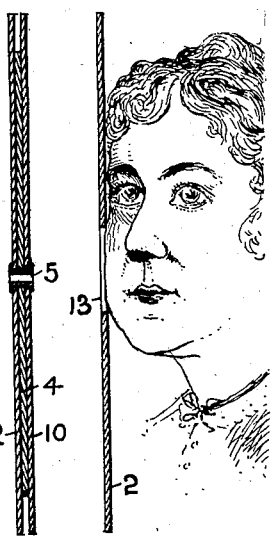
Figure 5:
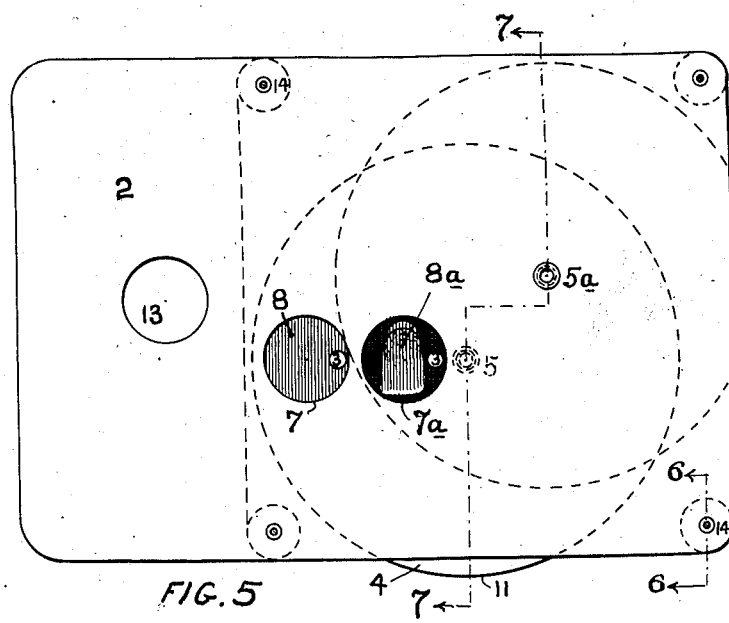
Figure 7:
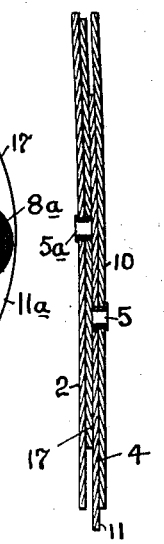
Figure 6:
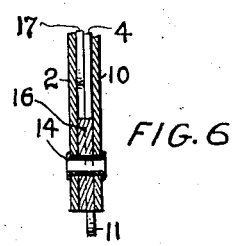
Figure 4:
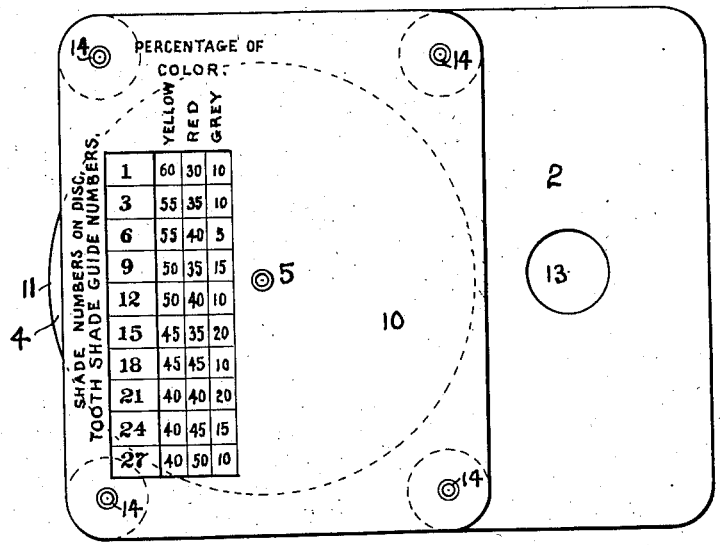
Figure 8:
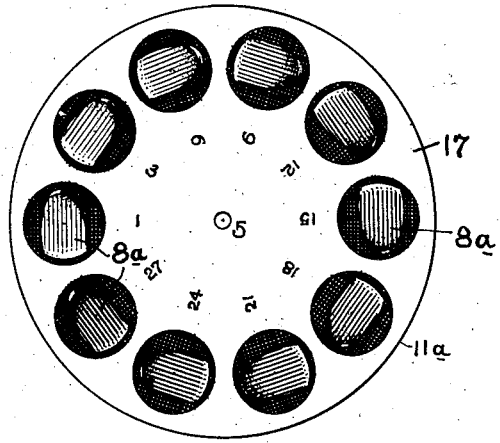
Figure 9:
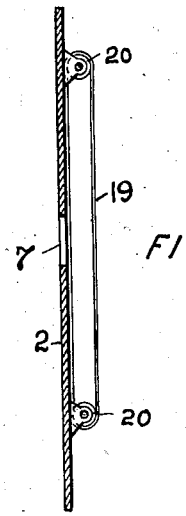
Figure 10:
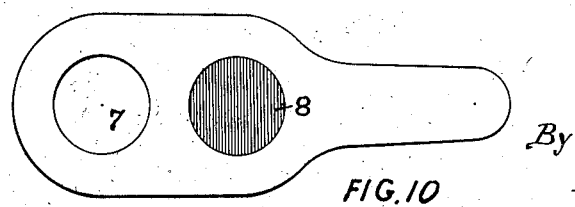

In connection with the more detailed description of my invention, I have shown suitable apparatus by way of examples, by which the method may be put into practice and also as an exposition of suitable apparatus covering the structural requirements of the invention, and in which:

Fig. 1 is a front view of a shield with adjustable colored surfaces constituting structural characteristics of my invention and which is adapted for carrying out the method thereof; Fig. 2 is a cross section of the same taken on line 2—2 of Fig. 1; Fig. 3 is a similar cross section taken on line 3—3 of Fig. 1, and showing application of the shield to a patient's cheek; Fig. 4 is a rear view of the device shown in Fig. 1; Fig. 5 is a front view corresponding to Fig. 1, but provided with an additional adjustable part having thereon surfaces representing artificial teeth of the various colors or shades; Fig. 6 is a vertical section on line 6—6 of Fig. 4; Fig. 7 is a transverse section of the same taken on line 7—7 of Fig. 4; Fig. 8 is a front view of the additional adjustable part shown in Fig. 5, and illustrating the various shades of the teeth; Fig. 9 is a vertical section illustrating a modified construction for exposing the colored surfaces to view; and Fig. 10 is a plan view of a modification of apparatus adapted for the carrying out of the method herein set out and forming a part of my invention.

2 represents a shield which may be made of heavy cardboard or any other suitable material and is provided with an opening 13 through which a limited portion of the cheek or other part of the patient is to be viewed, the adjacent portions being shielded from view by the carboard body of the shield surrounding the aperture. Adjacent to the aperture 13 is another aperture 7, preferably of approximately the same size. Pivoted at 5 and located at the back of the shield 2 is a disk 11 whose surface is provided with a plurality of colored portions 8 which may have all of the shades or tints from the lightest to the darkest and in which the various colors, such as red, yellow or gray, may be the dominant color or tint. Thus, for example, as shown in Fig. 1, there are ten colored surfaces 8 and these may be so colored as to start with the lighter or paler shade and terminate with the gradually increasing and darker shade in which the dominant color varies, and moreover, with the several variations in shades as to paleness or darkness, there may be a plurality of such shades of each degree of lightness or darkness, but in which the dominant color may be varied as imparting a yellowish cast or a pinkish cast. The disk 11 may have its perimeter projecting beyond the shield or mask 2, so that it may be adjusted to bring different colored portions 8 in alinement with the opening 7, and as these exposed colored portions 8 are of substantially the same area as the portion of the skin exposed through the opening 13, a fair comparison of the two is readily made. To protect the disk portion 11, a backing card 10 may be employed, the same being secured in position by spacing pieces 16 at the corners and eyelets 14 uniting the front and back cards through the spacing pieces, all of which will be readily understood by reference to Figs. 1, 2 and 4. In this way, the shield or mask may be pressed against the cheek of the patient, to expose the skin through the opening 13, without interference with the pivoted disk portion 11 carrying the colored surfaces, and hence the same may be adjusted while the shield is in contact with the patient. It is manifest that the opening 7 might be in the backing card 10 and with the disk reversed to present the colors through said opening and then use the shield in the reversed position, as the effect would be exactly the same, only that the disk would be arranged at the front of the main card 2 instead of at the rear of it. As shown in Fig. 1, there is an additional small aperture 7$^b$ in the shield card 2, the same being adjacent to the aperture 7, and it will be seen that the disk 11 has numbers arranged in respect to each of the colored surfaces, so that the number corresponding to any surface will be exposed through the opening 7$^b$, at the same time that the color to which it corresponds is exposed through the opening 7. This number will correspond to a shade number which may be printed in connection with a scale upon the backing card 10 or upon any associated card and which will indicate the proportions of yellow, red and gray (or other colors) that would enter into the make-up of the colored surface corresponding to the shade number. Such a scale is indicated on the back of the card portion 10, in Fig. 4. These shade numbers may simply relate to different colored surfaces, irrespective of the particular use of the device, or they may represent the shade numbers employed on tooth shade guides wherein any number represents a particular tooth shade. In this manner, the tint or shade best suited to the complexion of the person, so that it harmonizes, even though it differs greatly in actual color, may be selected by the use of the device, and by noting the number which shows through the small aperture 7$^b$, the particular shade of tooth so determined may be instantly assured by selecting the tooth corresponding to that shade number. Incidentally, the scale may indicate the proportions of the colors employed in the production of the artificial tooth, but that is only important in being a guide in the manufacture of the teeth so that the proper colors for any particular shade number can always be duplicated and assured with certainty.

Where the device is specially intended for dentists' use and only for the selection of teeth, the disk 11 shown in Fig. 1 may be made as illustrated in Fig. 8, in which the disk 11$^a$ has its surface 17 made, in general, similar to the disk 11 in Fig. 1, except that the colored portions 8 are made with the design of artificial teeth thereon, as at 8$^a$, the picture of the teeth being emphasized by being formed upon a dark background. Where the device is to be used for determining color effects, either identical in shade with the person or object viewed through the aperture 13, or in respect to being in harmony with the color of said person or object, then and in that event, the surfaces 8 may be tinted or colored merely as surfaces and without having any design, such as contemplated in the structure of Fig. 8. Such use may be resorted to by physicians who desire to compare patients' complexions with color tints which may indicate certain pathological conditions of the patient, and in that way be a guide to the physician as to the health of the patient; and especially is this the case, where previous tests or comparisons have been made when the patient has been in the best of health and note of the color comparisons have been recorded.

As another useful employment of the particular device, where the surfaces 8 are made to contain flat tints or shades, is the employment of the device by artists to determine the color constituents necessary to produce a shade or color effect upon the picture being painted to correspond to the shade or color tint of the person posing. In this case, the color or tint may be determined separately for the forehead, cheeks, neck or arms, as well as for the hair, eyes and lips, by way of example, so that the artist may be assured that in the finished picture he has been able to incorporate into the different portions thereof exactly the right colors to correspond to those embodied in the subject, and thus insure a realistic likeness.

It will be understood that the numbers which are to be seen through the small aperture 7$^b$ of the shield or mask may, if desired, be placed directly upon the colored surface 8 or immediately adjacent thereto, so that they may be viewed through the aperture 7 by a slight further adjustment of the disk after the proper color or shade has been determined. It is only essential that in some manner a number or other indicia shall be associated with the shade or color portions 8 which will enable the user of the device to properly locate the shade on the scale which is shown in Fig. 4, or which may be otherwise provided for use in connection with this device.

In Figs. 5, 6 and 7, I have shown a modified construction of the device illustrated in Figs. 1 to 4, inclusive, in so far as providing the shield or mask with two disks to be employed with separate apertures, such as a disk 11 for use with aperture 7 and a disk 11$^a$ for use with aperture 7$^a$, the disk 11 being the same as the disk 11 in Fig. 1, and the disk 11$^a$ being the same as the disk shown in Fig. 8, wherein the teeth designs are shown However, in this particular adaptability of these disks to the same shield, I have indicated upon their colored surfaces the shade numbers instead of employing additional apertures corresponding to 7$^b$. This adaptability of the shade numbers to the surface is in accordance with what I have already stated may be done when referring to the structure of Fig. 1. In this particular device of Fig. 5, it will be noted that the disk 11 is journaled to the rear card 10, as at 5, whereas the other disk 11$^a$ may be journaled to the front card of the device, as indicated at 5ª. Furthermore, it will be noted that these pivots 5 and 5ª are out of alinement whereby the two disks 11 and 11ª are caused to overlap to such an extent as to enable surfaces of each of the disks to be simultaneously exposed through the apertures 7 and 7ª, as clearly indicated in Fig. 5. By this construction, the device may not only be especially adapted for dentists' use in selecting artificial teeth, but may also be adapted for the use of physicians in determining the pathological conditions of the patients. Also, it will be understood that while I have shown the disk 11ª as being formed with the color effects corresponding to teeth and with the design of teeth illustrated, I do not confine myself to the particular use in connection with the selection of artificial teeth, as other designs and coloring may be employed, such as would be necessary in determining the color in artificial eyes, but what is shown is by way of example only and not as limitation.

While I have shown a simple and inexpensive construction of device for utilizing my improved method of determining color shades I do not in any manner limit myself thereto. It will be understood that instead of the disks employed in connection with the shield or mask, an endless band, as indicated at 19. in Fig. 9, may be employed, the same passing about guide rollers 20 arranged above and below the aperture 7 in the shield. Any other suitable means may be employed for securing the same results, and I, therefore, do not restrict myself to the particular apparatus shown. It will also be understood that while a screen with adjustable parts connected thereto is desirable, the same is not necessary to the practice of my improved method and, in this respect, it may be understood that if the screen is employed, the various shades as to color may be upon separate cards or carriers and these may be associated with the corresponding shade numbers and be separately held in position for comparison with the skin or surface exposed through the aperture of the shield. Furthermore, the shield is not absolutely necessary, as the surfaces having the shade or color may be directly placed against the skin or object with which comparison is to be made for determining the shade or composition thereof, and it will also be understood that, if desired, the colored surfaces may be associated on the same card with an aperture so that when the aperture is placed against the surface with which the color is to be compared, said surface will show through the aperture and in close relative position of the colored surface on the card. In this way, there would be a small shielding part about the exposed surface of the skin or object, so as to concentrate the vision upon a relatively small area of the person, for the better making of the comparison. This modified construction, wherein the shield and the colored surface are associated in an integral card, is illustrated in Fig. 10.

From the foregoing, it will be understood that while some suitable form of apparatus is desirable for the convenient testing of the color or shade requirements, nevertheless, the method of determining the color constituents in the surface or object examined may be performed with separately colored samples, whether made on cards or other materials, and having a designating number or other indicia which may be utilized in respect to a suitable scale which will determine the color constituents and also the relative proportions of the same.

As far as I am aware, there is at the present time no generally accepted classification of human complexions which could be considered as sufficiently exact to be used as a satisfactory basis for the selection of the shade in artificial teeth which will be most pleasing for any given case, nor even to readily give an intelligent determination of the color constituents both as to their kind and proportion which may form any particular complexion, and it is, therefore, specially the purpose of my invention to provide not only the classification of such complexions, but also colored surfaces whether in the flat or in various designs, such as teeth, eyes, etc., having definite color constituents according to the classification and which may be compared with the complexion to be simulated or with which harmony is to be provided in the teeth or other object as a means of facilitating the dentist, physician, artist or other person in quickly determining the requirements or conditions in any particular case. For example, it is very common to simply designate persons as a "brunette" or "blonde", but seldom do they consider or recognize important differences in depth of color in each of these classes, and more particularly fail to recognize equal important differences in color composition, as might warrant the assumption of a "yellow blonde" and a "red blonde", for example, as sub-classification in the general class of "blondes"; and similarly, in respect to "brunettes". It is also evident that there are great numbers of people who are bteween "blonde" and "brunettes" and the color effects of the skins of these people may all be sub-classified by determining the color constituents which would have to be employed in the test colors which closely approximate or compare with the color effects embodied in the skins of such persons, and by the employment of my present invention, the physician, dentist, or artist may each readily and accurately determine the class and sub-class of color and shade to which such skins belong.

As before stated, certain data is required in connection with the provision of the test color surfaces and which, by cross reference, will at once provide definite information as to the colors employed in the test surfaces, giving the proportions of the several color components in any test surface and, moreover, which will also, in the preferred form, incorporate this data in such a manner as to facilitate the classification of complexions into groups and the determination of the dominant color in each group, whereby the selection of teeth having similar or harmonious dominant colors may be easily made.

While the devices herein illustrated and described may be conveniently employed for securing the benefits of the present invention, it will be understood that the improvement is directed more to the method involved in the preparation and comparisons, whereby the proper color constituents may be accurately and quickly determined, rather than in any special apparatus for enabling the said method to be put into practice. This will be understood by considering the structure illustrated in Fig. 10, wherein the comparison or test colors are on separate cards or supporting means and which may be used with or without the shield openings and in association with the classified data or scale by which the color constituents may be determined.

It will also be understood that where the colored test surfaces are on separate parts, as in Fig. 10 for example, with or without the apertured shield portion, the color components of which the colored surface is composed may be printed or marked directly upon the part or sheet carrying the colored surface, in which case the indicia will constitute direct data instead of a cross reference to a chart or scale common to a plurality of colored test surfaces, as in Figs. 1, 4 and 5. It will be seen, however, that, as shown in Fig. 4, the chart or scale is mechanically associated with the colored surfaces, even though the latter are adjustable relatively to the shield. In those cases, it is more convenient to have a chart or scale common to a plurality of colored surfaces, but I do not restrict myself to any particular manner of marking the color components in association with the colored surfaces themselves, the manner of association shown being by way of example only.

While I have more particularly referred to cardboard as the basis of the devices for the color scheme, it is to be understood that these supporting means for the color may be of cardboard, paper, metal, glass, celluloid, wood or other substance, and the color may be incorporated to the surfaces in any desired manner or by any desired means, such as by painting, staining, dyeing or printing. To facilitate the making up of these test colors, they may be printed in large sheets and stamped into disks which may be pasted upon the supporting means.

It is also to be understood that these colored slips or separate parts may be held in position by the hand back of the opening in connection with the shield, if of the form of Fig. 1, and if placed upon disks, as illustrated therein, a plurality of such disks may be used with a single shield, either simultaneously, as in Fig. 5, or interchangeably by substitution, if so desired. If they are used interchangeably, then each disk may have a large number of sub-classified colored surfaces under a single general class, which would facilitate the carrying out of the method where it was to be extended to a great variety of classes and sub-classes.

I have described my improved method and means in that particularity which I deem to be the best exposition of my invention, and that which I prefer in commercial practice, but I do not restrict or confine myself to the minor or secondary details, as such are susceptible of modification and may be resorted to as matters of mechanical skill and without a departure from the spirit of the invention.

Having now described my invention, what I claim as new and desire to secure by Letters Patent is:

1. Means for determining the color characteristics of a surface of an object, such as the skin of a person, comprising a shield having two apertures in relatively close association, one of which extends entirely through the shield whereby a limited portion of the skin or other part of a person may be viewed, combined with a rotatable sheet journaled to the shield and having thereon a plurality of colored surfaces of a dominant color but respectively of different shades thereof, said colored surfaces so disposed upon the sheet as to permit them to be successively brought under the other of the apertures in the shield for comparison with the skin or other part of the object viewed through the other of the two apertures, and said colored surfaces each being associated with indicia by which its color constituents may be determined.

2. Means for determining the color characteristics of a surface of an object, such as the skin of a person, comprising a shield having two apertures in relatively close association, through one of which a limited portion of the skin or other part of a person may be viewed, combined with a rotatable sheet journaled to the shield and having thereon a plurality of colored surfaces of a dominant color but respectively of different shades thereof, said colored surfaces so disposed upon the sheet as to permit them to be successively brought under one of the apertures in the shield for comparison with the skin or other part of the object viewed through the other apertures, and said colored surfaces each being associated with indicia by which its color constituents may be determined, and wherein the colored surfaces are made in form and appearance to represent portions of the human body.

3. Means for determining the color characteristics of a surface of an object, such as the skin of a person, comprising a shield having two apertures in relatively close association, through one of which a limited portion of the skin or other part of a person may be viewed, combined with a rotatable sheet journaled to the shield and having thereon a plurality of colored surfaces of a dominant color but respectively of different shades thereof, said colored surfaces so disposed upon the sheet as to permit them to be successively brought under one of the apertures in the shield for comparison with the skin or other part of the object viewed through the other aperture, and said colored surfaces each being associated with indicia by which its color constituents may be determined, and wherein further the shield is provided with an additional aperture and also an additional sheet having thereon colored surfaces provided with indicia for determining their respective color components, said sheet also journaled to the shield on an axis out of alinement with the journal of the first mentioned sheet and adapted to cause its colored surfaces to be brought into alinement back of the additional aperture in the shield, said sheets being independently adjustable relative to the shield and to each other.

4. Means for determining the color characteristics of a surface of an object, such as the skin of a person, comprising a shield having two apertures therein one of which extends entirely through the shield and permits a limited portion of the skin of a person or other object to be viewed, combined with a disk journaled to the back of the shield and provided on its surface adjacent to the perimeter with a plurality of colored surfaces having a dominant color but successively varying in shade and whereby they may be brought into alinement back of the second opening in the shield for comparison with the color of the skin or object viewed through the other aperture, said colored portions of the disk provided with indicia by which the component colors of each of the colored surfaces may be determined, the perimeter of the disk projecting beyond the edge of the screen whereby it may be manually adjusted.

5. The invention according to claim 4, wherein further, the means is provided with a fixed chart or scale containing a series of indicia similar to that on the disk and having associated with each such indicia additional matter which specifies the proportions of the component parts of the color required to produce the particular shade of the surface corresponding to the respective indicia.

6. The invention according to claim 4, wherein the shield is further provided with a backing sheet between which and the shield proper the disk is arranged and protected, said backing sheet being secured to the shield by spacing pieces to provide the requisite space to receive the disk and terminating to one side of the aperture through which the skin is to be viewed.

In testimony of which invention, I hereunto set my hand.

GEORGE WOOD CLAPP.